United States Patent [19]
Herregods et al.

[11] Patent Number: 5,937,112
[45] Date of Patent: Aug. 10, 1999

[54] INTERACTIVE COLOR IMAGE DIGITIZING SYSTEM HAVING RESTRICTED MEMORY CAPABILITY

[75] Inventors: Marc Herregods, Hever; Eddy Op de Beeck, Edegem; Marc Goetschalckx, Ekeren, all of Belgium

[73] Assignee: Agfa-Gevaert N.V., Mortsel, Belgium

[21] Appl. No.: 08/960,071

[22] Filed: Oct. 24, 1997

Related U.S. Application Data

[63] Continuation of application No. 08/662,958, Jun. 13, 1996, abandoned.

[30] Foreign Application Priority Data

Oct. 28, 1993 [EP] European Pat. Off. .............. 09301161

[51] Int. Cl.$^6$ ...................................................... G06K 9/00
[52] U.S. Cl. .......................................... 382/319; 358/474
[58] Field of Search .................................... 382/299, 282, 382/162, 164, 318, 319; 358/401, 433, 474

[56] References Cited

U.S. PATENT DOCUMENTS

| | | | |
|---|---|---|---|
| 4,290,084 | 9/1981 | Minshull et al. ...................... | 358/433 |
| 4,587,633 | 5/1986 | Wang et al. ............................ | 358/448 |
| 4,656,524 | 4/1987 | Norris et al. ........................... | 358/280 |
| 4,656,525 | 4/1987 | Norris ................................... | 358/280 |
| 4,837,635 | 6/1989 | Santos .................................. | 358/401 |
| 5,027,196 | 6/1991 | Ono et al. ................................ | 358/76 |
| 5,185,662 | 2/1993 | Liston .................................. | 358/524 |
| 5,212,568 | 5/1993 | Graves et al. ......................... | 358/474 |
| 5,218,455 | 6/1993 | Kristy .................................. | 358/403 |
| 5,223,954 | 6/1993 | Miyakawa et al. ..................... | 358/474 |
| 5,313,572 | 5/1994 | Yamamoto et al. .................... | 395/145 |
| 5,519,501 | 5/1996 | Hamilton ............................... | 358/453 |

*Primary Examiner*—Joseph Mancuso
*Assistant Examiner*—Vikkram Bali
*Attorney, Agent, or Firm*—Baker & Botts, L.L.P.

[57] ABSTRACT

A process is described for digitising the relevant portion of a color image by a system with reduced memory capacity. The color image is scanned twice. The image signals (30) are sub-sampled (I) the first time and spatially reduced (II) the second time to the relevant image portion. The spatial data (35,36) for the relevant image portion are determined on an interactive work station (34), on which the sampled image signals (33) are displayed. Initial sampling and resampling by the scanner take place with the same spatial resolution. By carrying out the sub-sampling and the spatial reduction during scanning, an important saving of memory is realized. Owing to the fact that the color image is digitized in one single step, register faults are avoided.

13 Claims, 3 Drawing Sheets

INTERACTIVE COLOR IMAGE DIGITIZING SYSTEM HAVING RESTRICTED MEMORY CAPABILITY

This application is a continuation of application Ser. No. 08/662,958, filed on Jun. 13, 1996, now abandoned.

DESCRIPTION

1. Field of the Invention

The present invention relates to a process and a device for spatially selectively digitising optical colour images on a transparent or opaque carrier by means of a system with restricted memory capacity and signal-transmission rate for use in electronic document scanners, pre-press systems or copying systems.

2. Description of the Prior Art

A digitiser is known to convert an optical image into electric signals giving each individually an indication of the optical density of a very limited portion (pixel) of the image. On colour images different spectral densities are distinguished that are defining the colour components in which the colour image is being analyzed. The operational characteristics of the digitiser will depend among others on the spatial resolution and the density resolution. The spatial resolution can be characterised by the linear dimensions of a pixel or the number of pixels per running unit length measured on the original, e.g. pixels per mm or dots per inch (dpi). The density resolution provides an indication of the number of tone values the full range covered by the minimum and maximum densities of each colour component is digitised into. The expression "resolution" used herein below refers to the spatial resolution only.

A number of digitisers have a variable resolution as a result of the use of optical, mechanical or electronic means, whereas on other devices the resolution is fixed, which considerably simplifies their construction thereby reducing their cost.

The relevant image portion on a colour original is often provided on a restricted area of the image carrier. Alternatively, the image carrier as such may be significantly smaller than the surface area that can be sampled or read in by the digitiser. In many cases it may not only be necessary to delete margins on the original but also to read in or copy but well specified areas of a document or manuscript. In such cases it may not be advisable to read in the entire original. Therefore, several processes and devices have been proposed for efficiently selecting the image portion before any further image processing steps.

A first system consists of a lining-up table with an illuminated top and a digitising pad to which the user fixes the original for determining the spatial data of the delineation lines of the image-cropping of the area comprising the relevant image portion. On this lining-up table the size and the position of the original to be scanned are specified and in some cases even an angle of rotation if a rotation of the image portion through a given angle is required.

In U.S. Pat. No. 4,771,336 of Obtorii an integrated system of digitising pad and copier is disclosed enabling an accurate manual specification of the selected image portion. However, the described system is not suited for cropping transmission originals in the usual small format sizes with sufficient accuracy.

On drum scanners the above-mentioned problem has been overcome for reflective-art and transmission originals. The originals are pasted on a transparent drum that can be revolved by hand or by electronic means, e.g. by means of a stepping motor. When specifying the image-portion delineation lines the drum is installed in the scanning system or in an auxiliary system. In both systems a carriage slowly moves past the drum. The described carriage comprises an optical means with a light source projecting the colour image of the image area involved either on a camera lens or on a screen so as to enable the operator to define a rectangular image portion. A drawback of the above-defined procedure resides in the fact that the shape of the image-cropping is restricted to a rectangle that cannot be defined with pixel accuracy and that it requires a careful mounting of the original on the drum with the need to avoid any displacement of the original during subsequent operations.

When scanning small transmission originals (24 mm×35 mm or 4 inch×5 inch) on a flatbed scanner the original can be enlarged by optical means or be viewed through a magnifier to ensure a sufficient spatial accuracy when defining the image portion. In EP 0,453,661 of Leonard a device very similar to a microfiche reader is disclosed that projects the optically enlarged image on a display screen. First the operator shifts the original until an angular point of the selected image portion coincides with fixed cross-hairs. Next he actuates a signal commanding the system to record the actual position of the original at that very moment.

According to prior-art systems the definition of the spatial parameters for the image portion occurred merely in an optical way. The manipulation of an additional optical device by the operator is required for obtaining the desired result. To obviate that inconvenience the state-of-the-art systems offer the possibility of previously performing one extra digitising operation, called pre-scan herein below. Such pre-scan is commonly performed at low resolution, sometimes at higher speed, offering the advantage of a substantial reduction of the number of image signals as a result of the restricted resolution. The image signals resulting from the pre-scan are transmitted to an imaging printer for physically printing the image or are displayed on a so-called preview monitor. Then the spatial data for the image portion are acquired from the print or the monitor display screen equipped with additional peripheral devices, such as an electronic mouse, a track-ball, a key-board, etc. In the case of the print the above-mentioned systems are used again but the print is substituting the original. The image displayed on the preview monitor is user-friendlier and allows the defining of an accurate image-cropping on the original.

However, the procedure described above is presenting the drawbacks of the additional time required for the pre-scan and the electronic processing and storage of the pre-scan image signals that may be substantial if the resolution is not reduced one way or the other. The common arrangement of conventional image acquisition systems requires storing the image signals of the full surface area of the image including the signals for unnecessary image areas in a memory means. As a consequence, an unreasonably high memory capacity is required, which is considerably increasing the manufacturing costs of such system.

The ACS-100 scanner developed and marketed by Agfa-Gevaert N.V. in Mortsel, Belgium, and suited for electronic pre-press can perform a pre-scan at restricted resolution. A reduction of the resolution is obtained by optical means in the fast scanning direction and by mechanical means in the slow scanning direction by a change in the scan motor speed. However, the precision optics needed for that end make the system more expensive.

In U.S. Pat. No. 5,157,516 of Bachar a process for image positioning and for rotating an image portion of an original is disclosed consisting in performing a preliminary scan on a flat image and visualising it on a video display screen to be viewed by the operator. Thereupon the operator marks two points on the image displayed and on a page layout. Next, the image is physically rotated in the image plane and optically scaled up or down, and the rotated and enlarged image is scanned again as such. The described process also requires an optical system for modifying the resolution, the rotation being obtained by mechanical means.

In a number of up-to-date digitisers the resolution reduction is performed by electronic means. In U.S. Pat. No. 4,631,599 of Cawkell a device for selectively copying certain areas of an image on printed documents or including graphic art is disclosed. It became apparent that for reasons of economy the image processing had to occur at a resolution level corresponding to the requirements of the specific application. The device as described in the invention first made an optical scan of the full image thereby generating an image signal. That first signal is stored in a memory. Next, the image portion to be copied has to be defined. That step is followed by a second optical scan of the selected image portion only. According to the above-mentioned process the image data at different resolutions is reduced by:

acquiring data from a scanning system with lower resolution, or reducing the size of the original (DIN A4 size); or periodically storing and disregarding data in a high-resolution scanning system controlled by electronic counters.

The data reduction is effected by a selective control of the scanning operations or of the data generated by a scanner. The scanner is arranged for scanning an image integrally or in a well-defined area thereof without the need of special optics or scanning head movements or exchanges. The full image after being scanned by the system and stored in memory may be retrieved by the operator.

The image-processing unit of the patent comprises a video display screen for visualising the image and for enabling the operator to view and to manipulate the image. The operator then marks angular points of the image portion selected for being copied and thereupon the document is selectively scanned.

However, the invention described above is limited to merely binary images (printed art, graphic art). It does not provide any solution to register problems that may rise when scanning several colour components nor to the huge amount of data involved in continuous tone colour images. As claimed by the invention the first scan of the image is first integrally stored in memory. In the second scanning operation only the selected image portion is scanned. As it will be shown herein below it is not advisable to store the pre-scan at full resolution into the memory.

In U.S. Pat. No. 4,656,525 of Norris an electronic copier for colour images is disclosed. An optical colour image of a photo-print or a transparency is scanned twice to provide a first set of image signals at low resolution and a second set at high resolution. Part of the first set is displayed on a preview monitor.

According to the above-mentioned colour system digitisation of the colour information is effected in sequence in three passes, i.e. R G B, for both sets. This requirement results from the fact that the copier is sequentially presenting three different colour filters. Moreover, the system is restricted to integrally storing but the first set of image signals. The three image components of the second set are exposed upon the scanning thereof. While every line is scanned the high resolution signals of them are subjected to an image enhancement and are directly transmitted to the CRT for exposing the film unit. As the system does not provide sufficient memory capacity for integrally storing the relevant image, it is not suited for performing complex but often necessary colour corrections. Furthermore, the preview monitor in the above-described invention is merely used for viewing the image and not for e.g. defining the relevant image portion. In the low-resolution scanning mode but every fourth line is scanned and one single signal for the average intensity of four-pixel blocks in a same line is produced by the scanner. As a result, it is not possible to define the image-portion delineation with very high accuracy.

The HORIZON scanner, another system developed and marketed by Agfa-Gevaert N.V., digitises every image in the fast scanning direction always at the same resolution and immediately performs the resolution reduction electronically. In the slow scanning direction the resolution is reduced by an increase of the stepping motor speed. The described scanner scans a colour document sequentially in three passes which provides an insufficient reliability for image recording. Moreover, every additional scanning cycle for each colour component consumes extra time.

OBJECT OF THE INVENTION

It is an object of the invention to provide a process for accurately and user-friendly defining and digitising a relevant image portion of the colour image by means of a system with a fixed scanning resolution and by utilizing but a restricted image storage capacity.

Another object of the invention is to perform digitisation at a higher speed resulting in an increased amount of scanning inputs by the operator in a same period of time.

Yet another object of the invention is to provide the highest possible spatial accuracy of colour components of digitised images one with respect to the other.

SUMMARY OF THE INVENTION

The present invention relates to a process for digitising a relevant image portion of a colour image comprising the following steps:

generating a first set of image signals by an initial sampling of said colour image;

reducing the number of image signals contained in said first set;

displaying the reduced image signals on an interactive work station;

acquiring spatial data with regard to said relevant image portion on said interactive work station;

generating a second set of image signals by resampling said colour image or a portion of said colour image comprising said relevant image portion; and restricting the number of image signals contained in said second set by restricting the image signals mainly to the image signals specified by the spatial data;

and wherein said initial sampling and resampling are performed at the same spatial resolution.

Preferably, the initial sampling and resampling of the colour image occur simultaneously for all colour components. Preferably, the restriction of the image signals contained in the first set preferably occurs by sub-sampling and virtually at the same time as the initial sampling. Preferably, the reduction by spatially restricting the image signals contained in the second set occurs virtually at the same time as the resampling.

In the present context digitising refers to the conversion of an optical image into electric image signals. As a result the image data are generated electronically, e.g. as follows. On the carrier a colour image is visualised by exposing the carrier to any illuminating means emitting e.g. white light. The so obtained light image resulting from the reflection or transmission of the emitted light is pixelwise presented to a photosensitive member possibly after directing the light through a colour filter. The photosensitive member converts the pixel intensity into e.g. an analog electric signal that is sampled and, possibly after enhancement, presented to an A-D (analog-digital) converter that generates from the analog electric signal a digital electric image signal. Said image signal is representative of the presented light image. Said image signal in digital form is suited for being transferred by means of any transmission means, e.g., an electrical or optical cable, to a device arranged for storing image signals in a volatile (RAM) or permanent (disk) memory means.

A colour image according to the invention is perceived by the human eye as density differences on a carrier and may be, e.g., a continuous tone image consisting of two or more colour components. The expression "continuous tone" as used in the present context has the common meaning of images with a virtually continuous density rendering to the eye. Also line art, characters, graphics and text in a limited number of colours can be digitised according to the same process, even when they appear on the original in combination with continuous-tone images. The term "colour images" includes screened photographic or synthetic images as well. The colour image by itself may occupy a restricted surface area of the possible scanning surface area. To a scanner suited for scanning documents in DIN A3 size a document in DIN A4 may be presented. The scanner can capture the size by means of sensors or a command given by the operator. The image signals generated for the colour image during initial sampling and resampling can already be restricted automatically to this DIN A4 size, resulting in an additional gain of time.

The expression "image portion" as used in the present document is referring to an image spatially restricted to a certain plane figure the outline of which is situated within the colour image but otherwise having all characteristics of the colour image. An image portion is sometimes denoted with the term "subsection". The outline commonly constitutes a rectangle the sides of which are running parallel to the slow and fast scanning directions. However, the outline of the image portion may also be circular, trace a polygon or delineate any plane figure.

The relevant image portion is the image portion the operator is interested in. During visualisation on the interactive work station the operator is getting a view of the entire image and will select the relevant image portion therefrom.

An image signal is any signal constituting together with a number of similar signals the display of an image. These successive signals may be applied equally in time and vary continuously on an electric conductor, such as a coaxial cable in analog video applications. The moment at which the image signal will be applied often determines the position of the pixel on the carrier this image signal is corresponding to. In many cases the voltage amplitude of the image signal is proportional to the optical density at the corresponding location on the carrier.

The image signal may be stored in digital form in a memory unit. For an image signal in digital form commonly eight storage elements are used each of which may represent a zero-state and a one-state, so that each image signal may be represented by 256 discrete values. To each of these discrete values a certain density for image processing and recording may be allocated allowing an optimum visual perception and aesthetic appearance of the image on a carrier on which it is going to be recorded.

As the image involved is a colour image, several image signals have to be generated for each location or pixel on the carrier. The colour signal from a pixel on the image is commonly separated into three main components, i.e. red, green and blue (RGB), either by exposing the image successively to these colours and sampling the electric signals of the photosensitive member, or by exposing the image to white light with a broad spectrum and filtering the light reflected or transmitted by the image through a red, green or blue filter before it impinges on a photosensitive member. Usually for each pixel typically three image signals are generated, i.e. red, green and blue. However, the inventive process is also applicable to a system generating image signals for cyan, magenta and yellow (CMY) and possibly another and fourth image signal, i.e. black (CMYK). Any other model, apart from RGB and CMYK, describing a full or even an incomplete colour space can be used for representing a colour by means of the image signals according to the present invention.

Sampling is referring to the recording and short-term storage of, e.g., an analog electric signal generated by a photosensitive member. If but a single photosensitive member is present (occasionally one for each colour component) as in the case of conventional drum scanners, this photosensitive member shifts its position with respect to the image carrier so that at a given moment every picture element or pixel of the image is addressing light to that member. At that instant the electric signal generated by the member is sampled and presented in digital form to a memory means where the signal is stored for further processing. On one-dimensional CCD array scanners digitising is effected for an entire line of pixels at one time. On two-dimensional CCD array scanners digitising is effected for a rectangular image or image portion.

If the image is digitised according to a rectangular array of M rows and N columns into K colour components, the entire image is constituted of M*N*K image signals. As such amount is often too substantial for being stored in the available memory space, several technologies for reducing the amount of image signals have been developed the main of which are:

Spectral reduction: the number of colour components K is reduced, e.g. from three (R, G and B) to one, e.g. green or any other combination of R, G and B signals. As a result, the total number of bits representing all colour components of one pixel is reduced. The same result may be obtained by reducing the density resolution of each colour component.

Spatial reduction: the scanned rectangle is scaled down, so that but an image portion is stored in the available memory space. As a result, M and/or N decreases so that the above-mentioned product also decreases.

Resolution reduction: the size of a scanned pixel is increased, so that a smaller number of pixels M' or N' is obtained on a same length. The new product, i.e. M'*N'*K decreases accordingly.

The reduction of the number of image signals aims at an economy of memory space and a saving of image transmission time. Spectral reduction and resolution reduction may be applied to initial sampling, whereas spatial reduction typically applies to the second digitising operation, when the spatial data required to that end are known.

An interactive work station is a system for electronically displaying or visualising images on a black-and-white or colour screen, sometimes called preview monitor, and on which the operator can specify locations on the image by means of a key-board, an electronic mouse, a light pen, a track-ball and the like. The specified locations are then unambiguously related to positions on the image. Examples of such systems include Macintosh™ System 7.x, IBM™ PC and compatible PCs with Windows 3.1 environment. Furthermore, work stations such as SUN Sparc™ with a Unix™ environment are suited to the same end.

Spatial data stands for the full description of the outline of the relevant image portion. If the image portion is rectangular and parallel to the scanning directions, the co-ordinates of the two angular points on a diagonal line, or an angular point and the length and width of the rectangle will serve. For a circular outline the centre and the radius of the circle, or three points on the circle or all elements required for an unambiguous definition of a circle will do. If the outline traces a polygon the angular points of such polygon will suffice. For an outline with a random shape such shape may be described by a number of analytic expressions or by listing the co-ordinate data of all pixels situated on the outline. The area surrounded by the outline need not be convex nor fully linked together, as it may occur that the operator specifies two disjunctive rectangles corresponding to two image portions that are to be scanned at one time. Graphic page description languages, such as AgfaScript, enable the defining of graphic objects by means of a series of graphic commands. AgfaScript is a trade mark of Agfa-Gevaert AG in Leverkusen, Germany. Such graphic object unambiguously describes a path consisting of closed or open sub-paths. If the path is used for specifying an area all sub-paths are closed. The set of closed sub-paths describes in a machine-independent system of co-ordinates a relevant partial area of the full area. The partial area can be matched to the colour image thereby defining the relevant image portion.

Alternatively, a more or less complex partial area may be described by providing for each pixel on the colour image— at the resolution of the scanning system—a bit indicating whether or not the mapped pixel is pertaining to the relevant image portion. The bits for all pixels constitute a bit map. The memory space requirement of the bit map for the image signals of a colour image having three colour components displayed with a density resolution of eight bits for each of the colour components is twenty-four times smaller as that of the image signals of the colour image.

Such a bit map can be generated by having a graphic object described in a page description language processed by an interpreter. A graphic object can thus be represented by a procedure, a path consisting of sub-paths, also by a tree structure with run-lengths per horizontal image line and a bit map. The term "graphic object" as used herein below is referring to a procedural description in a graphic page description language as well as to a run-length encoding and a bit-map representation.

The image signals of the image portion stored in the memory can always be restricted to those specified by the graphic object. The relevant image signals may be concatenated and stored without special precautions provided that the graphic object be always included with these image signals.

The data acquisition can be effected by linking the movements of a lighting spot or cursor having a well-defined shape, e.g. a cross shape, to the movements of an electronic mouse, a light pen, a pen on a digitising pad, to pressing of keys, such as arrow keys or the like, for specifying a certain position on the screen by visual contact. The cursor being located on the selected position the operator signals to the interactive work station that this location is to be stored. The location may be an angular point of a rectangle, polygon and the like, or the centre of a circle, or a peripheral point of the circle or any other point defining the analytic shape of the outline. Such analytic shape may be the outline of a figure, a logotype or a character. Manual keyboard entry of this data by the operator simply as x,y co-ordinates defining the outline is also possible. All these shapes are covered by the expression "graphic object".

Depending on the application and on the operating performances of the scanning system, resampling of the colour image can be effected over the full image area or be restricted to a portion of it comprising at least the image portion. On a one-dimensional CCD array scanner the CCD row may first be shifted to the first scanning line on the image that partially coincides with the image portion. However, the construction of the scanning system may require that the colour image be always scanned entirely and identically to the initial scan.

The image signals of the second set are mainly restricted to the image signals indicated by the spatial data, which means that an image portion or subsection is selected from the entire colour image. The thus selected image portion comprises at least the image portion that is bounded by the outline defined by the spatial data. The selected image portion will often be an envelope rectangle the sides of which are running parallel to both scanning directions and that closely delimits the specified image portion. The restriction to the relevant image portion may also be effected by physically scanning but part of the entire image.

As described above, the colour components of the spectral bands of a pixel will be obtained by using colour filters or several colour exposures. In the above-mentioned U.S. Pat. No. 5,157,516, under "background of the invention", a number of systems are disclosed for obtaining the colour components of one or more pixels at one time. For a system with a one-dimensional array of CCD's the process is considered according to which the image carrier is exposed to white light and three independent CCD arrays digitise simultaneously a single image line, on account of the fact that the reflected or transmitted colour light of the original impinges simultaneously through three distinct colour filters on the correct CCD array. According to an alternative process a filter wheel with three colour filters is provided that makes each colour filter chop the light once for each scanning line. As a result, a single CCD array is sufficient for digitising nearly simultaneously the three colour components of a single scanning line on the colour original. In such case three colour exposures are effected sequentially in one line duration, which corresponds to the meaning attributed to the expression "simultaneous" as used in the present document. Although a system wherein all image signals are first digitised for one colour component of the entire colour image and next for the further colour components presents the inconvenience that the speed and metric accuracy of the system is restricted due to register errors, it is included in the scope of protection of the present invention provided the initial sampling and the resampling be effected at the same resolution.

Due to the optical and mechanical simplicity of a scanner the scanning system may have to perform the initial sampling and the resampling at equal spatial resolution. By using the inventive process such simple type of scanner may be integrated in a scanning system without the need of providing it with a large memory capacity for storing image signals. For reasons of accuracy and image quality and on account of the time required for adjusting the resolution, even a scanner offering spatial resolution adjusting possibilities may be selected for digitising images at one and the same resolution.

The process of the present invention is operative at a fixed spatial resolution, which may be the full or highest resolution offered by the scanner. The scanner itself is driven identically for the first and second scanning passes. For the scanner there is— mechanically, optically and electronically—no distinction between initial sampling and resampling. The electronic components in the scanning system connected to the scanner are particularly provided for performing the reduction of the amount of image data during scanning.

Sub-sampling is a common electronic resolution-reduction technique. According to the simplest and most common technique every other pixel and every other line are eliminated from the scanned image, as will be explained in further detail herein below with reference to FIG. 2. The reduced image, e.g., retains only the image signals with an odd row- and column number. Thus, the amount of data is reduced hereby by a factor four. Higher reduction factors are possible by storing each time, e.g., only the first pixel and line of a group of four. Furthermore, this technique enables the application of rational reduction factors. The higher the reduction the lower the accuracy of the spatial data on the image portion will be, which should be borne in mind when converting the spatial data to the image at actual resolution. Therefore, upon conversion the selected image portion should be extended with the number of pixels or lines that disappeared at the location of the outline in the first set of image signals.

The expression "nearly simultaneous" applying to both reductions, i.e. reduction by sub-sampling on the first set of image signals and reduction by spatial restriction on the second set of image signals, denotes that the reduction is effected upon transmission of the image signals to the memory space for the image. It is essential for the inventive process that on no occasion whatsoever the M*N*K signals for the colour image have to be stored integrally in the memory space. A substantial amount of memory can thus be saved.

BRIEF DESCRIPTION OF THE DRAWINGS

The invention will be described below by way of example with reference to the accompanying drawings wherein.

DETAILED DESCRIPTION OF THE INVENTION

Figure 1:
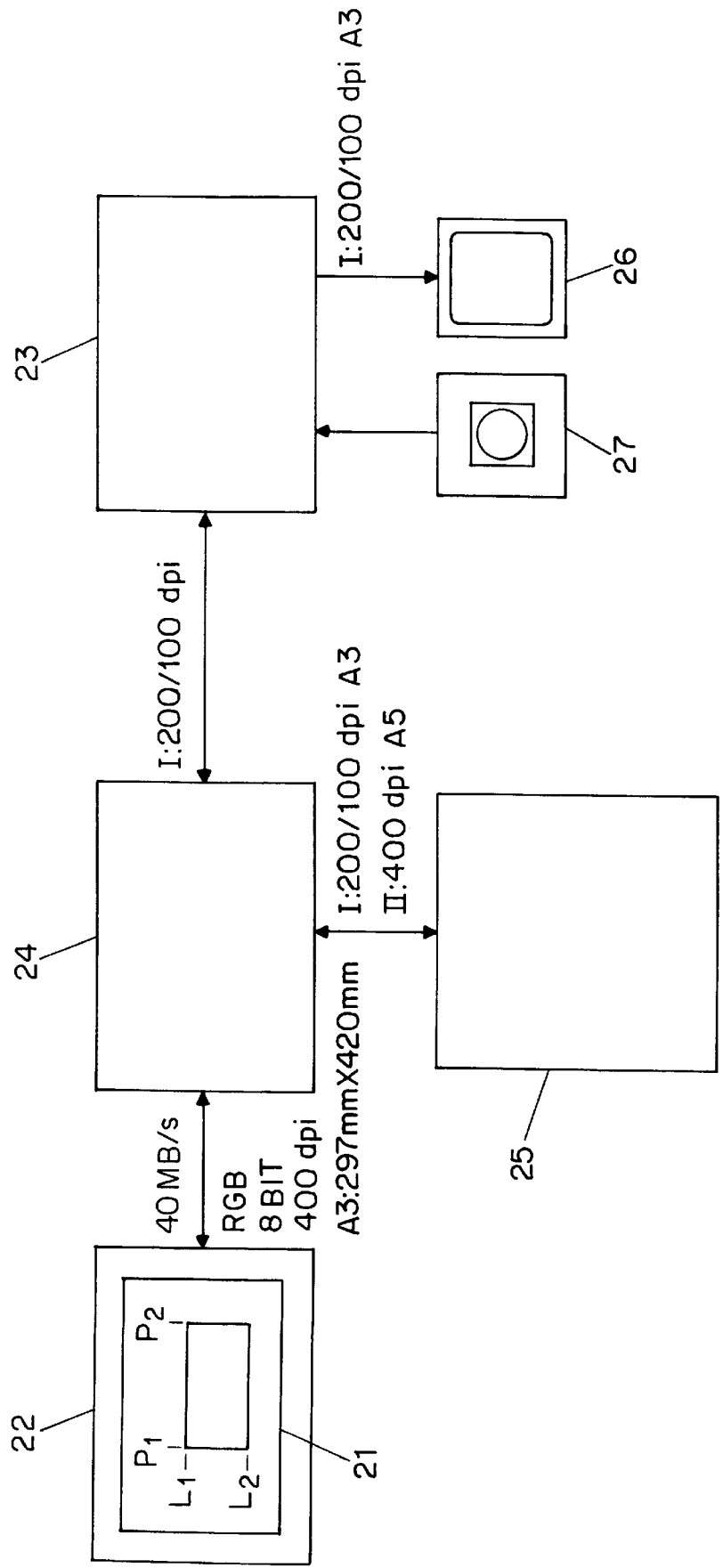
FIG. 1 is a diagrammatic representation of a scanning system connected to an interactive work station.

Referring to FIG. 1 a diagrammatic representation of the digitising system is shown. Carrier 21 with the colour image is mounted on scanner 22. According to the inventive process mounting and positioning of the original 21 is to be effected only once. On the interactive work station 23 the operator gives a command for performing a first digitizing. The operator may include the resolution-reduction factor in his command or leave the calculation thereof to the image-processing unit 24. The command is transmitted through control channels from the interactive work station 23 to the image-processing unit 24. The image-processing unit 24 gives scanner 22 an instruction for digitising the entire colour image on carrier 21. Scanner 22 converts the spectral optical density of the pixels of the colour image on the carrier 21 into image signals. For the specific application of the present invention the image signals consist of three bytes a pixel, each of the bytes representing a number from 0 to 255 corresponding to the optical density of the image for the red, green and blue colour components respectively. The scanning resolution amounts to 400 dpi. The maximum scanning format has the size of a DIN A3 sheet (420 mm×297 mm). The amount of image data generated on this system is in the order of 90 MB and can be scanned in a time interval of 2.25 s, thus producing a data rate of 40 MB/s.

Although the system offers the possibility of separately scanning each colour component in sequence, which results in a decrease of the data transmission rate by a factor three, the image-processing unit 24 of the invention is arranged for acquiring the image data at the above-mentioned rate of 40 MB/s. It has the double advantage of a quick process course for the entire process since scanning is effected in a single pass and of an optimum metric correlation between the distinct colour components. A common problem of three-pass scanning resides in the fact that due to tolerances on the mechanical movements and relative deviations between successive scanning operations the image signals on one and the same location in the image matrix do not match exactly the same picture element on the carrier. Such register errors lead to annoying colour shifts when reproducing the image signals on a colour display or on a print.

Therefore, the document is scanned integrally and simultaneously in all colour components at the rather high resolution. It became apparent that specific hardware had to be developed for the high transmission rates involved. A gate array (not shown on FIG. 1) always captures the image data of four successive pixels, which corresponds to twelve bytes, since each pixel supplies three colour components. The gate array classifies the scanned image signals in the order stated RRRR GGGG BBBB. Each of these three groups may be stored in a four-byte word. The image-processing unit is now capable of running at the high transmission rate, since the storage access cycles can be word-organised. Before further transmission of the image signals to the memory module 25, the image-processing unit 24 performs a resolution reduction by sub-sampling. This type of data reduction is preferred, as it offers the advantage of a faithful storage of the colour rendering. There is only a limited detail loss that is, however, perfectly acceptable for an image that is merely serving for the selection of an image portion. As the image-processing unit 24 is typically equipped with a minimum storage unit 25 of 32 MB, a reduction by a factor two in both scanning directions is sufficient, because the amount of data is consequently reduced to 22.5 MB. Although this type of sub-sampling is a rather simple process the rate at which it is being effected should be considered with due care. As a matter of fact, feeding with image signals still continues at a rate of 40 MB/s. After sub-sampling the additional transmission amounts to 10 MB/s. The data reduction can be effected electronically, which offers a considerable advantage for the simplicity of the construction of scanner 22 that consequently does not require optical systems with adjustable enlargement scale, nor motors with variable speed. Another advantage resides in the fact that the operations of data reduction and scanning are performed simultaneously, so that there never is a need for storing the entire image of 90 MB in storage unit 25.

Next, the sub-sampled image signals are transmitted from the memory module 25 to the interactive work station 23, typically through a Small Computer Systems Interface (SCSI) or an Ethernet connection. To reduce the transmission time through these rather slow standard physical connections the image processing unit 24 can perform a further resolution reduction or transmit but a first image portion to the interactive work station 23. Upon arrival of the sub-sampled image data for the colour image in the interactive work station they are displayed on the preview monitor 26 thereof. The document 21 with the colour image still being mounted on the scanner 22, the operator views a display of the colour image on the preview monitor whom is offered the opportunity of selecting the relevant image portion by means of the electronic mouse 27. Therefore, the operator first selects the nature of the figure built by the outline: a rectangle, a circle, a polygon or any figure whatsoever. If the operator selects a rectangle the interactive work station gives a prompt requesting his specifying two angular points of a diagonal, e.g. the upper left angle and the bottom right angle, or his keying-in the co-ordinates thereof on a numeric keypad (not shown on FIG. 1). Occasionally, the left, right, upper and lower boundaries of the rectangular portion may be entered. For a circle, e.g., the centre and the radius or a point on the circle is queried. For a polygon the operator has to specify all angular points in sequence, whereupon he gives an instruction for closing the polygon. If the operator wishes to select a rectangular image portion the sides of which are not running parallel to the scanning directions, this type of rectangle can be entered as a polygon. The system of the present invention will then construct the smallest envelope rectangle with sides parallel to the scanning directions, so that the rotated rectangle will be entirely enclosed in it. The operator may also enter a graphic object.

After the operator's approval of the specified area defining the image portion, the nature of the figure and the co-ordinates of these points—taking into consideration the spatial resolution reductions performed—the spatial data are transmitted to the image processing unit 24 through the control channels that connect it to the interactive work station 23. Once the image-processing unit 24 disposes of these data it calculates the first line $L_1$ and the last line $L_2$, as well as the first pixel $P_1$ and last pixel $P_2$ of the rectangle comprising the specified portion.

Again the image-processing unit 24 gives the scanner 22 a command for scanning the entire colour image at the same resolution. This way image signals similar to the those of the first scanning run are transmitted from the scanner 22 to the image-processing unit 24 at the same rate of 40 MB/s. For this second scanning pass simultaneous scanning of the three colour components is very advantageous, as the image signals will further serve for image processing and for generating prints as reproduction of the original colour picture. Avoiding register errors is even more important at this stage than on the preview monitor.

Next, the image-processing unit no longer performs any resolution reduction but instead reduces the amount of data by involving the spatial data. The fact that this data reduction and the scanning are performed simultaneously offers the advantage that there is no need for storing the 90-MB image signals of the entire colour image in the storage unit 25. This means a considerable saving in component cost for the system. As long as the line number of the scanned line is smaller than $L_1$, the image-processing unit 24 will transfer no data to the memory module 25. As soon as line number $L_1$ is reached, the image-processing unit 24 counts still $3*P_1-1$ image signals more, that are not stored in the memory module. The factor 3 stems from the number of colour components. As soon as this number of image signals has been transferred to the image-processing unit 24, this unit starts storing all image data being then transferred, and counts until $3*(P_2-P_1+1)$ image signals have been stored in the memory module 25. From this moment on, again no image signals are stored until pixel $P_1$ of the next line presents itself. This signal as well as the $3*(P_2-P_1)+2$ ones are stored again. This process is repeated for every of the $L_2-L_1+1$ lines to be scanned. After these lines have been scanned, either the action of scanner 22 is continued until completion of the scan area, or the image-processing unit 24 commands scanner 22 to finish scanning prematurely, which gains some time. Anyway, no more image signals are transferred from image-processing unit 24 to memory module 25 after line $L_2$ has been scanned. After this second scan operation the image signals of the image portion are available in memory module 25.

In prior-art mechanical and optical systems for spatial reduction it was mostly necessary to scan a rectangular image portion completely and to store it in a memory. The benefit of the immediately electronic reduction is the fact that the envelope rectangular image portion is scanned completely indeed, but that only the image signals described in a graphic object or by a corresponding bit map need be stored. This often enhances the capabilities of a system with limited memory capacity. So, a 32-MB system is capable of storing and processing an amount of image signals that corresponds with a scanned A5 colour document (210 mm×148 mm) on 400 dpi. However, the image portion need not have the form of an A5 document, although this is shown in the figure as an illustration. For a 32-MB system with 24 bits per pixel, the total area of the pixels constituting the image portion should not exceed a 400-dpi resolution, which is the surface area that corresponds with an A5 document.

The operator can give commands via the interactive work station 23 for allowing the image-processing unit 24 to further process the image signals in the memory module, to transmit them to a printing unit or to a permanent memory medium such as a hard disk or a magnetic tape. Image signals stored on a permanent memory medium can be processed or printed later.

In a system built around the XC305 or XC315 colour copier—both of them marketed by Agfa-Gevaert N.V.—the image signals of the image portion can be immediately processed further by the image-processing unit 24. Processing steps comprise colour processing, e.g. by the AGFA Color Management System (trademark of Agfa-Gevaert N.V.) and screening for optimal and reproducible colour rendition by an electrophotographic process. A technique used therefor has been described in BE-P Application 09300713 with priority of Jul. 12, 1993 and entitled "Rastermethode voor een schrijfsysteem met beperkte densiteitsresolutie" (Screening method for a writing system with reduced density resolution) and EU-P Application 93202522.4 with priority of Aug. 27, 1993 and entitled "High quality multilevel halftoning for colour images with reduced memory requirements". The image signals of the processed image portion can then be sent back immediately to, e.g., the XC305 system, which transforms those signals in colour densities on paper.

A benefit bound with the temporary storage of the whole image portion in full resolution is the fact that an image can be mirrored or rotated by multiples of 90° without any loss of quality. This may give rise to gain of time during printing. Depending on the orientation it was introduced, an A4-size document can be printed with the most favourable orientation.

The image signals of the image portion can be transmitted via a network- or point-to-point connection for further image-processing, rendition and recording, storage or image communication.

Figure 2:
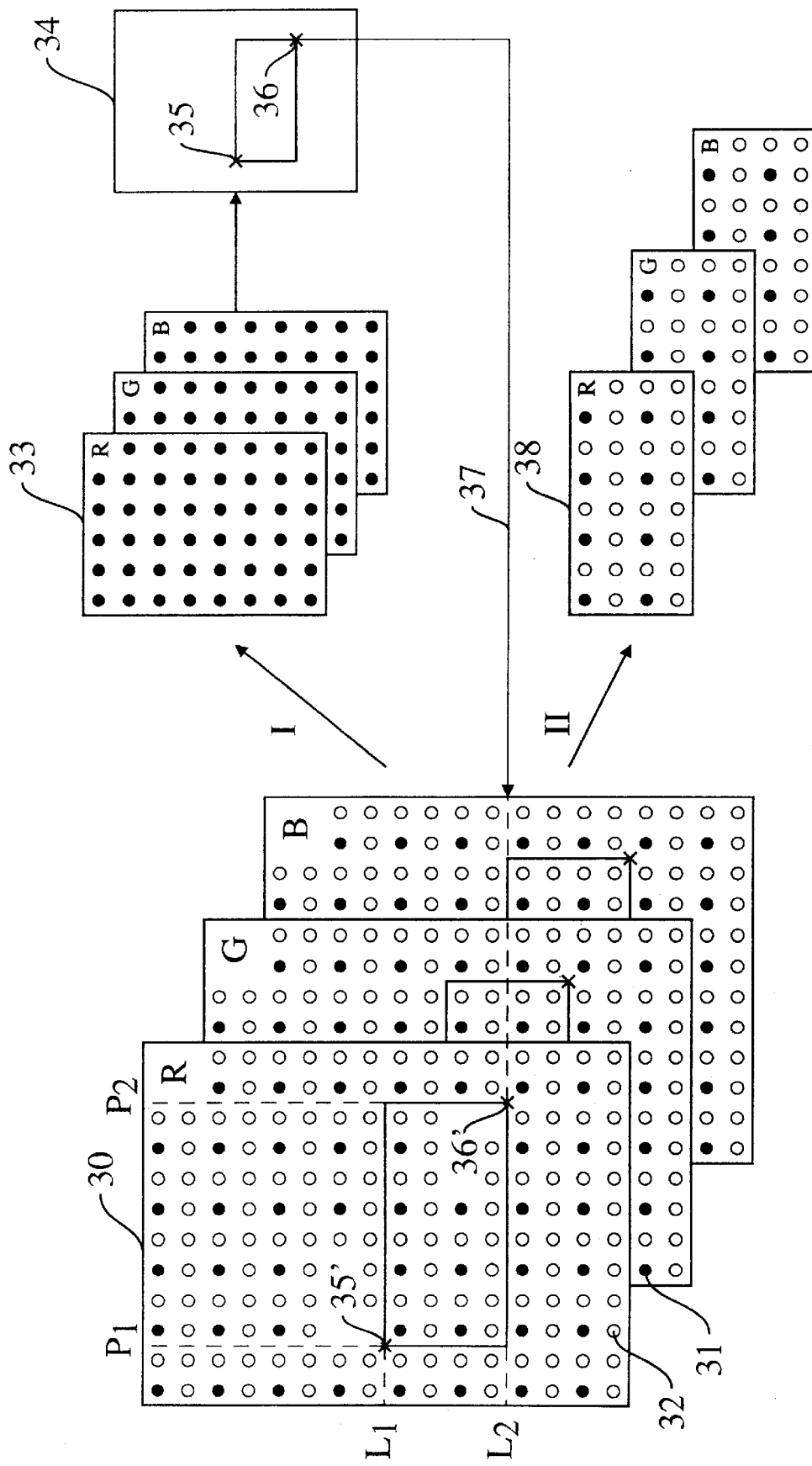
FIG. 2 is an illustration of the image signals and the reduction operations wherein equal reduction factors are applied in both scanning directions.

In FIG. 2 we represent diagrammatically how the image signals are processed according to a first embodiment of the method of the invention. The three rectangles 30 that partly hide each other represent the image signals after digitisation of an entire colour image scanned on the resolution of the scanner. The full circles 31 and the empty circles 32 represent pixels which in principle are equivalent. All pixels resulting from digitisation of the red signal form a rectangular matrix indicated by the letter R. The same applies to the green and the blue signal, indicated by G and B respectively. In the first digitisation, the first step—in the figure indicated by I—is carried out. The image is sub-sampled with a reduction factor of 2 in both directions, which boils down to the selection of the pixels indicated by a black disk 31 only. One reduces hereby the number of pixels per line as well as the number of lines by a factor 2, which yields the sub-sampled image signals 33. In the next step those sub-sampled image signals 33 are represented on the preview monitor 34. The operator can indicate on this visual representation of sub-sampled image signals the spatial data that determine the relevant image portion. In the figure this is represented by the left top corner 35 and the right bottom corner 36 of a rectangle whose four sides are parallel to the main scan directions. However, this zone may also be confined by an arbitrary polygon or a closed figure with curved outlines. In that case the smallest rectangle is determined that encompasses all outlines and has sides that are parallel to the main scan directions, which in this figure are thus horizontal and vertical lines. The spatial data for the envelope rectangle are transmitted to the image-processing unit indicated by arrow 37, so that the dots 35 and 36 can be transmitted to dots 35' and 36' on the original colour image. In the second scanning step the entire colour image is digitised again. This digitisation takes place with the same resolution as the digitisation for the first scanning step. For the scanner the first and second scanning steps look identical, but now the second step indicated with II is carried out. Only the pixels within the rectangle characterised by 35' and 36' are maintained and yield the image signals of the image portion 38. The image signals of this image portion are stored in the memory module and there are at disposal for further processing.

Figure 3:
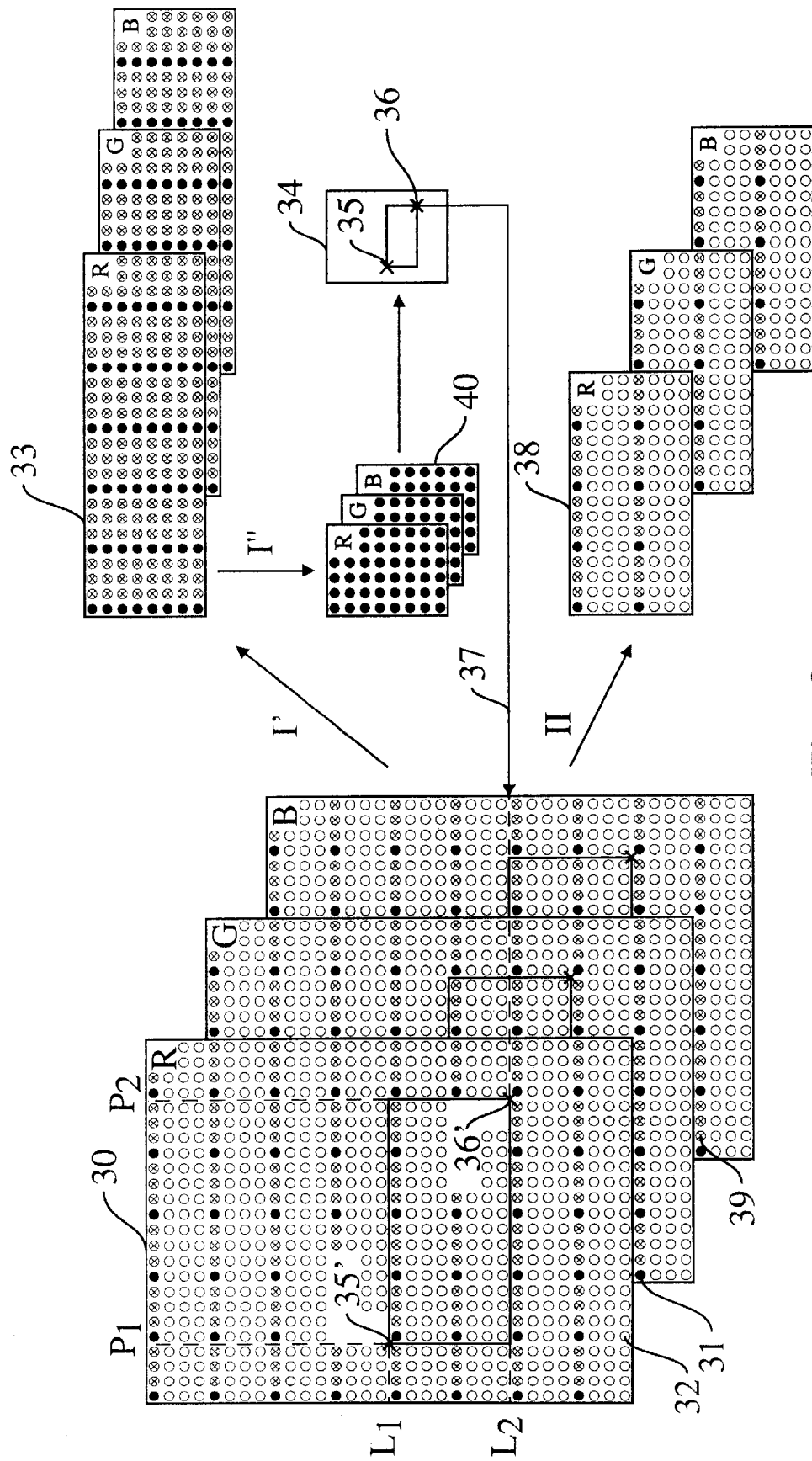
FIG. 3 is an illustration of the image signals and the reduction operations wherein in a first step I' only a reduction of the number of lines is produced.

In FIG. 3 the preferred embodiment is represented. The method slightly differs from that of FIG. 2 therein that the reduction by sub-sampling has been carried out on the rows exclusively in a step I'. These image signals are stored in the memory unit. In order to restore the geometry of the image, a second sub-sampling I' is carried out by the image-processing unit before the sub-sampled image signals of the colour image are transmitted to the preview monitor 34.

In this figure the pixels have been subdivided in three classes:

pixels whose image signals disappear in the first sub-sampling I', indicated by a circle 32;

pixels whose image signals disappear in the second sub-sampling I', indicated by a crossed circle 39; and pixels whose image signals are made available on the interactive work station, indicated by a black circle 31.

In this method the entire colour image 30 is digitised at a fixed resolution of 400 dpi. Hereby about 90 MB of image signals are generated at a speed of 40 MB/s. The image-processing unit 24 captures per pixel twenty-four bits simultaneously, eight bits for the image signal R of the red component, eight bits for the image signal G of the green component, and eight bits for the image signal B of the blue component of the light reflected or transmitted by the colour image. The gate array collects the image signals of four consecutive pixels and arranges them in the sequence RRRR GGGG BBBB, whereby four pixels give rise to three words of thirty-two bits each. These words are transferred to the memory module 25 under the supervision of the microprocessor in the image-processing unit 24. This procedure is repeated for all image signals belonging to the first scan line. As soon as the image signals for the second scan line—represented in FIG. 3 by circles 32—in the gate array present themselves to the microprocessor, the latter will prevent those image signals from being stored in the memory module. The same happens for the image signals of the third and the fourth scan lines in the digitised image 30. From the fifth scan line on the image signals are processed in the same way as for the first scan line. This procedure is represented in FIG. 3 by the arrow I'. The result of that operation is represented symbolically in 33. The sub-sampling that takes place at the same time as the first sampling thus performs a reduction of resolution in the line direction. The image signals that have been stored in the memory module 25 have then further to be transferred in step I" to the interactive work station 23 for being displayed on preview monitor 34. In this step again a sub-sampling is carried out, this time in horizontal direction only. From the image signals of four consecutive pixels, only those of the first pixel are retained each time. In this way the pattern of image signals as represented in 40 is obtained. This latter sub-sampling I"—in contrast to sub-sampling I'—does not constitute an essential element of the invention, but serves only to equalise the resolution of the image in both directions and has the additional benefit that the transmission of the image signals of the image-processing unit 24 to the interactive work station 23 is accelerated by a factor 4. These image signals have then experienced a resolution reduction by a factor 4 in both scan directions and can be displayed on preview monitor 34. There—as explained for FIG. 2—the operator selects a relevant image portion, e.g. by indicating angular points 35 and 36. These spatial data are transferred in step 37 to the points 35' and 36'. Again scanning occurs with the same resolution, and as has been described earlier, we obtain the image signals 38 of the relevant image portion in the memory module 25.

Various variations to the above-described preferred embodiment are conceivable and offer the accompanying technical benefits as described above. So, it is conceivable, e.g., to allow the first sampling of the colour image for the three colour components to take place sequentially. It's true that the possibility of making register faults is introduced thereby and that the total scanning time is enlarged, but for systems that cannot carry out sub-sampling quickly enough, this offers the benefit that the speed of transmission is lowered by a factor three. The register faults on the preview monitor are less disturbing than the same faults in the image signals of the definitive image portion.

The second sub-sampling too, possibly as a result of limitations of performance of the image-processing unit 24, can be carried out sequentially per colour component. The additional deceleration therefor is known and moreover problems in connection with register fault may be prohibitive.

Reduction of the image signals in the first set can also take place by reducing the colour components. E.g., only the image signals corresponding with the green colour component can be transmitted to the preview monitor. The drawback resulting there from is that the operator cannot carry out the selection of the separation image on a colour image, but has the advantage that the transmission time between memory module 25 and work station 23 decreases.

In order to put still less data at disposal for the preview monitor, one can even combine the resolution reduction with the reduction of the number of colour components.

Another reduction technique is limiting the number of bits per pixel. As has been described above, an image signal is stored in a byte. By representing all 256 possible values of a byte on 16 values, e.g. by dividing by 16, every image signal can be stored in a nibble of 4 bits. Doing so, the number of levels per colour can be reduced to 16, but on a monitor, in ideal conditions, only 64 levels per colour can be distinguished. The quality loss of this density resolution reduction will thus not be very noticeable and quite acceptable for the purpose the image signals are destined for, viz. to offer a visual image for indicating a separation image on a preview monitor.

Although the present invention has been described with reference to favoured embodiments, it is obvious to those skilled in the art that modifications of forms and details can be applied without departing from the spirit and the scope of the invention.

We claim:

1. A process for digitizing a relevant image portion of a colour image comprising the following steps:

generating a first set of image signals by an initial sampling of said colour image at a selected image resolution;

reducing the number of image signals contained in said first set creating a second set and storing said second set in a memory;

displaying the second set on an interactive work station;

acquiring spatial data with regard to said relevant image portion on said interactive work station;

generating a third set of image signals by resampling said colour image or a portion of said colour image comprising said relevant image portion at said selected image resolution; and deriving a fourth set of image signals comprising said third set of image signals restricted by said spatial data and storing said fourth set in a memory.

2. The process according to claim 1, wherein said initial sampling of said colour image takes place simultaneously for all colour components.

3. The process according to claim 1, wherein said resampling of said colour image takes place simultaneously for all colour components.

4. The process according to claim 1, wherein said reduction of the number of image signals in the first set takes place by sub-sampling.

5. The process according to claim 4, wherein said reduction by sub-sampling takes place almost simultaneously with said initial sampling.

6. The process according to claim 4, wherein said reduction by sub-sampling is realised by periodically eliminating complete scan lines from said first set.

7. The process according to claim 1, wherein said reduction of the number of image signals in said first set takes place by two consecutive sub-samplings.

8. The process according to claim 7, wherein said first reduction by sub-sampling takes place almost simultaneously with said initial sampling.

9. The process according to claim 7, wherein said first reduction by sub-sampling is realised by periodically eliminating complete scan lines from said first set.

10. The process according to claim 7, wherein said second reduction by sub-sampling restores the isometry in the image.

11. The process according to claim 1, wherein said deriving a fourth set of image signals takes place almost simultaneously with said second sampling.

12. The process according to claim 1, wherein said relevant image portion consists of mutually disjunct areas of the colour image.

13. The process according to claim 1, wherein said spatial data about said relevant separation image are described as a graphic object.

\* \* \* \* \*